J. PILUSHCZAK.
BICYCLE SLED.
APPLICATION FILED MAY 10, 1918.
1,291,115.
Patented Jan. 14, 1919.
2 SHEETS—SHEET 1.
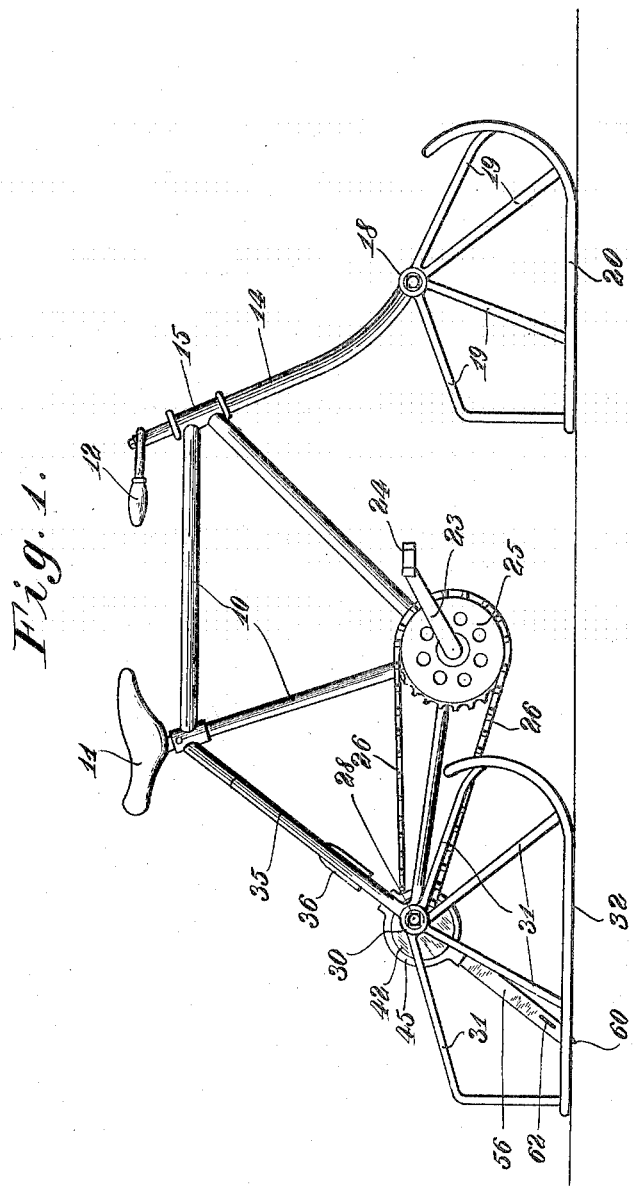
INVENTOR
Joseph Pilushczak
BY Oscar Geist
his ATTORNEY J. PILUSHCZAK.
BICYCLE SLED.
APPLICATION FILED MAY 10, 1918.
1,291,115.
Patented Jan. 14, 1919.
2 SHEETS—SHEET 2.
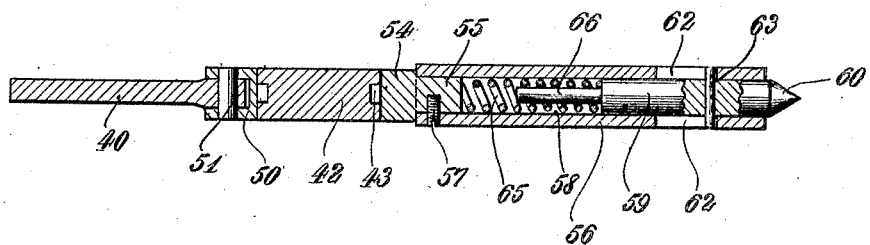
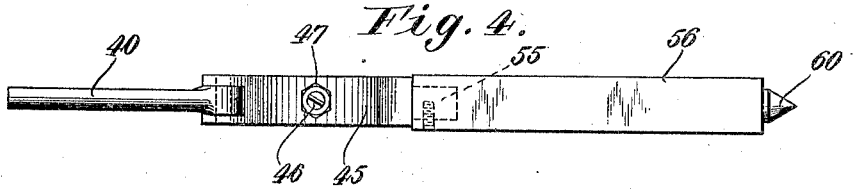
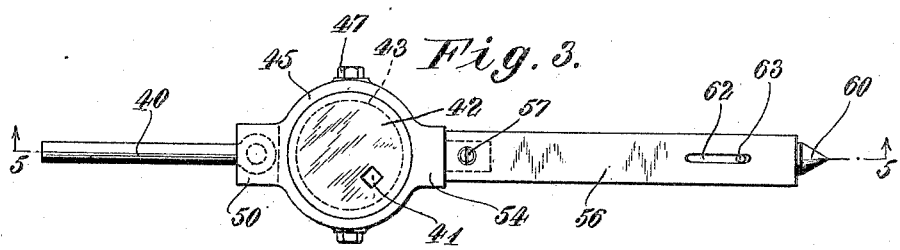
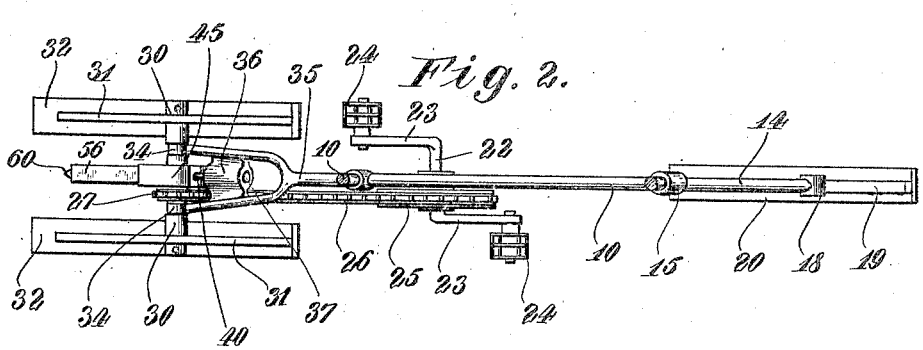
INVENTOR
Joseph Pilushczak.
BY Oscar Geier
his ATTORNEY

UNITED STATES PATENT OFFICE.

JOSEPH PILUSHCZAK, OF ROCHESTER, NEW YORK.

BICYCLE-SLED.

1,291,115.  Specification of Letters Patent. Patented Jan. 14, 1919.

Application filed May 10, 1918. Serial No. 233,658.

*To all whom it may concern:*

Be it known that I, JOSEPH PILUSHCZAK, a subject of the Emperor of Austria, residing at Rochester, county of Monroe, and State of New York, have invented certain new and useful Improvements in Bicycle-Sleds, of which the following is a specification.

This invention relates to improvements in sleds, and has as its special object the provision of means whereby a sled may be propelled over the surface of snow, ice or the like in an easy and rapid manner, similarly to the method used in propelling a bicycle.

A further object is to provide means whereby the sled may be steered by the operator, in a manner similar to that of the bicycle.

These and other like objects are attained by the novel construction and combination of parts hereinafter described and shown in the accompanying drawings, forming a material part of this disclosure, and in which:—

Figure 1 is a side elevational view, showing a bicycle sled made in accordance with the invention.

Fig. 2 is a top plan view of the same, portions of the frame having been removed.

Fig. 3 is an enlarged plan view of the actuating means.

Fig. 4 is a side elevational view of the same, and

Fig. 5 is a longitudinal sectional view, taken on line 5—5 of Fig. 3.

The construction of the frame 10 is similar in all respects to that of the standard bicycle frame of the diamond type, on which is adjustably mounted a seat 11, and a pair of handle bars 12, the handle bars being connected with the steering forks 14, which are rotatable within the bearing 15, formed with the frame.

The forks are engaged with a hub 18, connected with front runner 20 by support braces 19, the extending front end of the runner being upturned and curved as shown.

Engaged at the intersection of the lower frame elements 10 is a bearing, in which is mounted a shaft 22, having crank ends 23, upon which are rotatably engaged pedals 24, in the usual manner, while affixed upon the shaft 22 is a sprocket wheel 25, conveying rotary motion through a chain 26 to a rear sprocket 27, mounted on a shaft 28.

This shaft is supported in hubs 30, connected by support braces 31, with the rear runners 32 similar to that at the front and arranged in pairs, the shaft rotating in bearings 34, formed with the rear fork 35, between which is secured a block 36, having a central cylindrical opening 37, adapted to slidably receive a stem 40.

The central portion of the shaft 28 is squared and is fitted to be received within a square opening 41, formed in a disk 42, acting in the manner of an eccentric, and containing an annular recess 43 in its periphery.

This eccentric is mounted to rotate within a housing 45, in which, upon opposite sides, are inserted screws 46, provided with clamp nuts 47, so as to hold the points of the screws in adjustment within the recess 43.

Extending outward from the housing 45 at one end is a hub 50, in which, pivoted on the pin 51, is the inner end of the stem 40, slidable in the bearing 36.

Formed directly opposite to the hub 50 in the housing 45 is a similar hub 54, having a projection 55 adapted to engage in a square bar 56, and is held therein by the screw 57. This bar contains a central cylindrical opening 58, in which is slidable a plunger 59, having a conical contact point 60, extending outward through the end of the bar 56, which has slots 62 upon opposite sides, adapted to receive the pin 63, set in the plunger 59, the latter being normally pressed outwardly, due to the coiled compression spring 65, which surrounds the inner end 66 of the plunger.

In operation, the parts being assembled as indicated, and the pedals operated, rotary motion is transmitted to the rear shaft, causing the eccentric 42 to turn, thereby raising or lowering the bar 56 and engaging spur, the spindle 40 sliding freely within its guide, and due to the action of the eccentric, causes the spur to propel the sled by a step-by-step movement as will be clearly apparent.

It is further to be observed that the sled may be steered in a convenient manner and that due to the pair of runners at the rear, it is not easily thrown out of balance, while the spring 65 cushions the action of the spur 60, preventing any abrupt shock or jar from being transmitted to the rider.

Having thus described my invention what I claim as new and desire to secure by Letters Patent, is.

1. In a bicycle sled, the combination with a supporting frame, a single runner at the front thereof, and pair of runners at the rear, of a shaft engaging between said rear runners, means for rotating said shaft, an eccentric rigidly secured upon said shaft, a housing in which said eccentric rotates, means for guiding said housing, a bar secured in said housing opposite to said guiding means, and a spur in the lower end of said bar, said spur being contactable with the surface over which the sled travels.

2. In a bicycle sled, the combination with a tubular frame, a single dirigible runner mounted at the front thereof, a pair of runners at the rear of said frame, and a shaft upon which said rear runners are secured, of an eccentric rigidly engaged upon said shaft midway between said runners, means carried by said frame for rotating said eccentric, a housing surrounding said eccentric, a stem extending outwardly from said housing, guides for said stem by which it is compelled to operate rectilinearly, a bar secured to the opposite end of said housing and centrally between said runners, a spur slidable within said bar adapted to make contact with the surface over which said sled travels, and means for resiliently pressing said spur outward from said bar.

In testimony whereof I have affixed my signature.

JOSEPH PILUSHCZAK.

Copies of this patent may be obtained for five cents each, by addressing the "Commissioner of Patents, Washington, D. C."